United States Patent [19]

Kunz

[11] 4,091,722

[45] May 30, 1978

[54] APPARATUS FOR STEAM PEELING PRODUCE

[76] Inventor: Paul Kunz, Deishardtstr. 3, Dottesfeld, Germany, 5419

[21] Appl. No.: 674,553

[22] Filed: Apr. 7, 1976

[30] Foreign Application Priority Data

Apr. 15, 1975 Germany ............. 7511878 [U]

[51] Int. Cl.² ........................................... A23N 7/00
[52] U.S. Cl. .......................................... 99/479; 99/467; 99/584
[58] Field of Search .............. 99/516, 534, 536, 584, 99/483, 467, 477–479; 118/421, 423, 429; 134/134, 157; 137/571, 575; 426/482, 483, 506

[56] References Cited

U.S. PATENT DOCUMENTS

| | | | |
|---|---|---|---|
| 1,273,268 | 7/1918 | Pranke | 134/157 |
| 2,290,036 | 7/1942 | Davis | 134/157 |
| 3,627,011 | 12/1971 | Pond | 426/482 |
| 3,959,506 | 5/1976 | Kunz | 426/483 |

Primary Examiner—Harvey C. Hornsby
Assistant Examiner—Robert Pous
Attorney, Agent, or Firm—Finnegan, Henderson, Farabow & Garrett

[57] ABSTRACT

Method and apparatus for steam peeling produce in a pivotally mounted pressure vessel in which a bath of water is provided in the bottom of the vessel for receiving the produce charged to the vessel in a relatively impact-free manner and which can be withdrawn prior to steaming the produce under pressure and then returned to aid in the discharge of the peeled produce.

13 Claims, 8 Drawing Figures

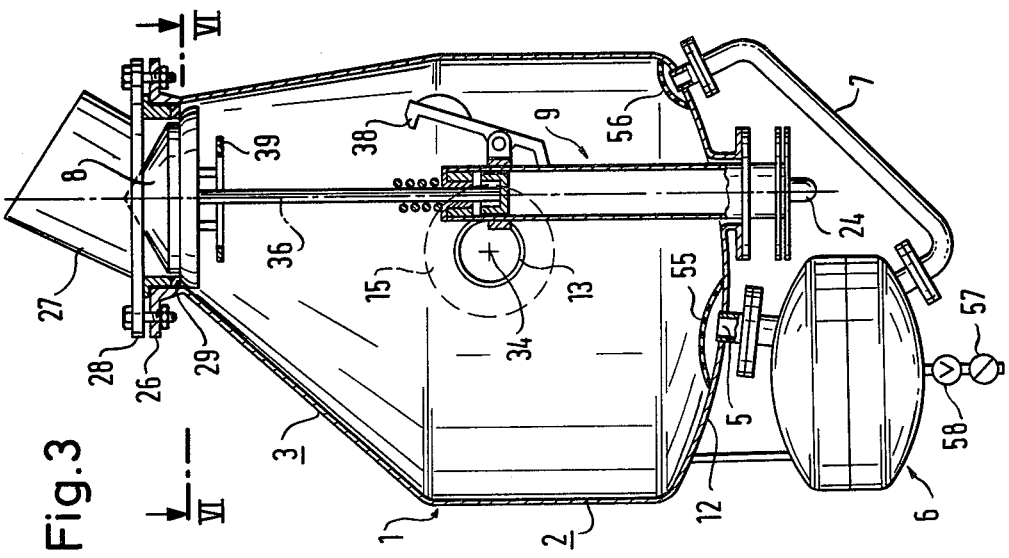
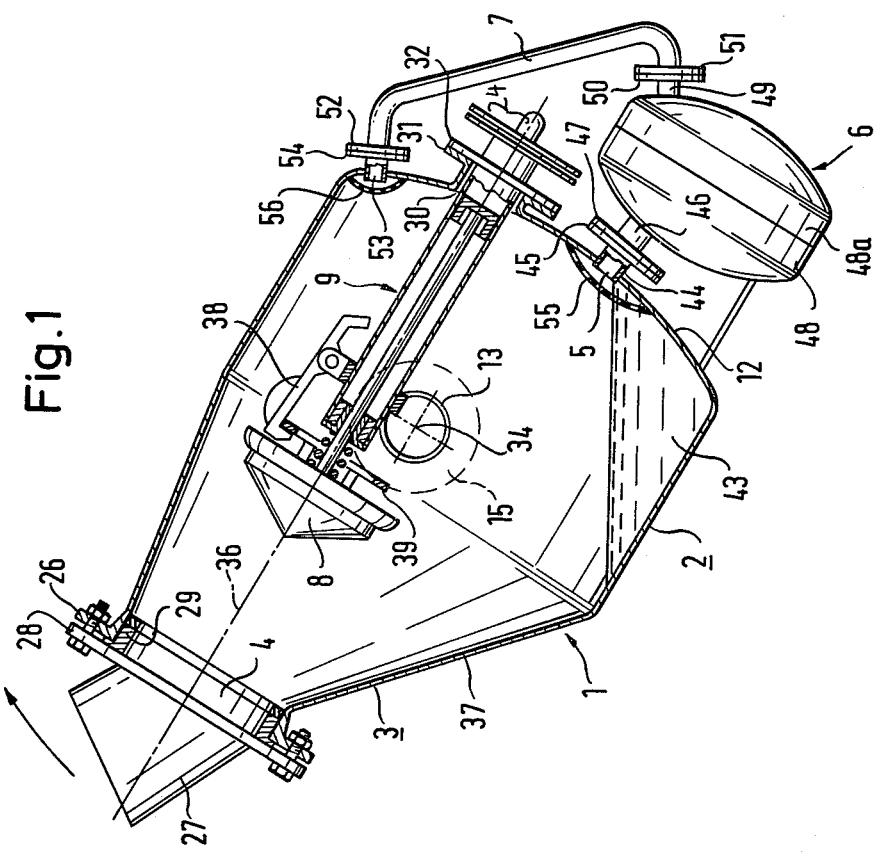

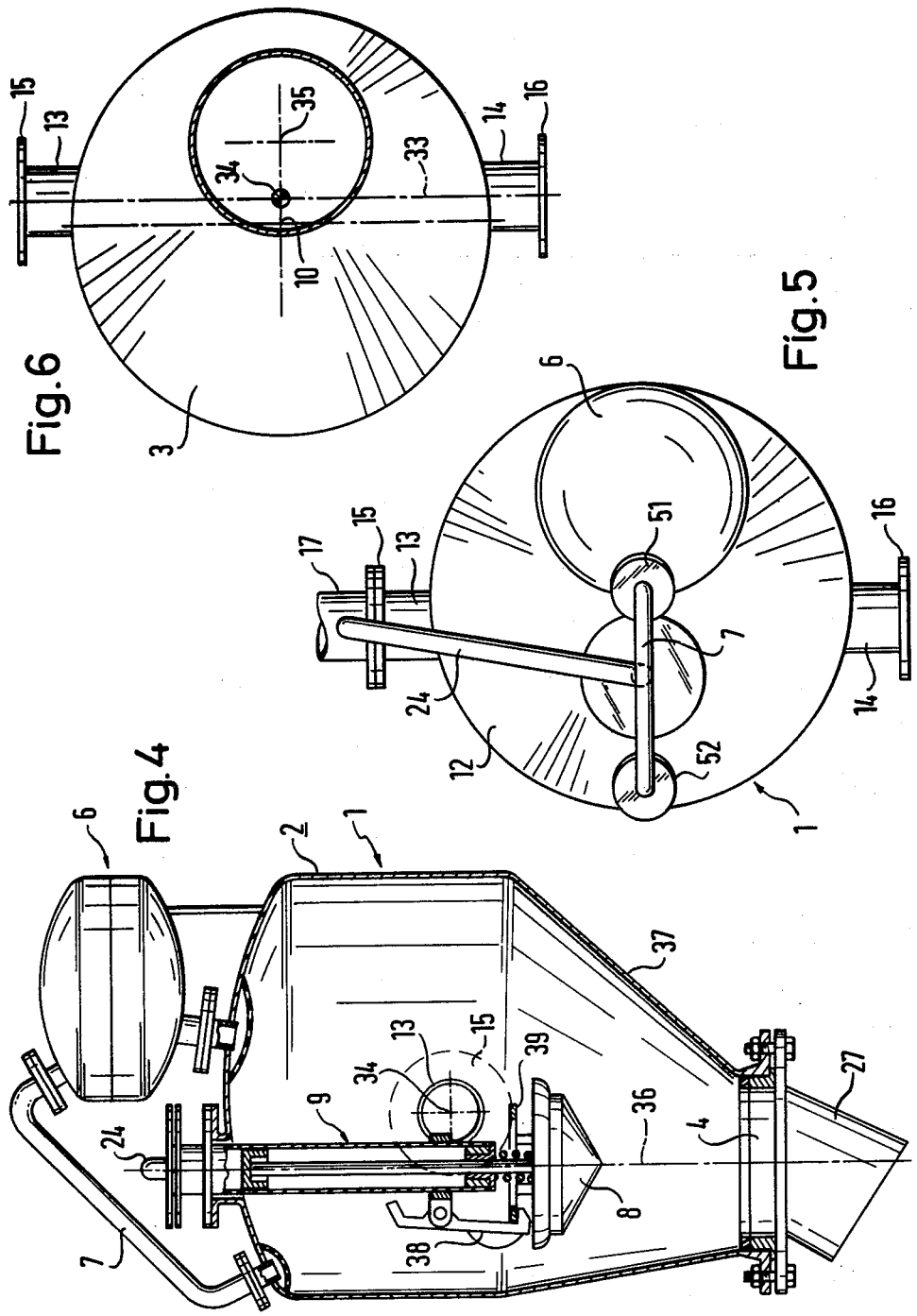

APPARATUS FOR STEAM PEELING PRODUCE

This invention relates to a method and apparatus for steam peeling produce and more particularly to a new and improved method and apparatus for steam peeling produce in a pivotally mounted pressure vessel in a more careful and gentle manner than has heretofore been provided to preserve the integrity of the produce without affecting the peeling operation.

A conventional steam peeler generally of the type contemplate by this invention is disclosed, for example, in German Pat. No. P 12 34 690. The apparatus disclosed in this reference is specifically designed for peeling potatoes and is so constructed that the produce to be peeled is fed into a filler opening in the top of the pressure vessel of the steam peeler while the latter is positioned in a generally vertical direction on a pivotally mounted horizontal axis. The lid for the vessel opens inwardly to receive the produce and after the vessel is filled, the lid is then closed and the steam admitted so the peeling operation can take place. At the end of this operation, the lid is opened and the pressure vessel is then turned over so that the filler opening points vertically downward to allow discharge of the peeled produce.

Thus, the fruit, vegetable or other produce to be processed is simply poured into the pressure vessel through the filler opening which causes it to impinge not only against the lid adjacent the opening, but against the bottom as it drops into the vessel. As a result of this mode of introduction and operation, it is impossible to prevent bruising or crushing of the produce and this is particularly bothersome with delicate fruits such as tomatoes, peaches, or the like.

Accordingly, it is an object of the present invention to provide a method and apparatus for the steam peeling of produce that permits the produce to be introduced into the pressure vessel in a more gentle and careful manner and that preserves the integrity of the produce without interfering with the steam peeling operation.

It is a further object of this invention to generally provide an improved method and apparatus for the steam peeling of produce.

In accordance with the present invention, there is provided a method for the steam peeling of produce in a pivotally mounted pressure vessel which comprises feeding the produce into the vessel under gravity, providing a bath of water in the bottom of the vessel for receiving the produce as it falls into the vessel in a relatively impact-free manner, withdrawing at least a portion of the water bath following receipt of the produce and thereafter closing the vessel and introducing steam to peel the produce.

Preferably, the withdrawn water is returned to the vessel following steaming to assist in the discharge of the peeled produce from the vessel.

The present invention further includes apparatus for accomplishing the improved method for the steam peeling of produce which comprises a pressure vessel pivotally mounted on a generally horizontal axis and adapted to receive the produce by gravity in a feeding position and to discharge the peeled produce in a discharge position, means for opening the vessel to permit feeding the produce and for closing the vessel to permit steaming under pressure, means providing a bath of water in the interior of the bottom of the vessel while in said feeding position for receiving the produce falling into the vessel in a relatively impact-free manner, and means permitting at least a portion of the water bath to be withdrawn after receipt of the produce and prior to steaming of the produce in the vessel. Preferably, means are also provided for returning at least a portion of the withdrawn water to the interior of the vessel following steaming to assist in the discharge of the peeled produce from the vessel in the discharge position.

Owing to the provision of this water bath, it is possible to treat produce and particularly soft fruits with special gentleness and care and, in combination with a provision for readily withdrawing the water bath, to ensure a clean peeling operation. Fruit of awkward shape and size, such as cucumbers and manioca, may now also be processed in an efficient and satisfactory manner.

It is to be understood that both the foregoing general description and the following detailed description are exemplary and explanatory but are not restrictive of the invention.

The accompanying drawings which are incorporated in and constitute a part of the specification illustrate some embodiments of the invention and together with the description serve to explain the principles of the invention.

OF THE DRAWINGS

FIG. 1 is an elevational view, partly in section, of the pressure vessel of a steam peeler according to the present invention in a feeding position for loading of the produce to be peeled;

FIG. 3 is an elevational view, partly in section, of the device of FIG. 1 but showing the vessel in its operative position and slightly modified to permit removal of condensate;

FIG. 4 shows the pressure vessel of FIGS. 1 and 3 in the discharge position as also shown in FIG. 2;

FIG. 5 is a plan view showing the essential parts of the bottom of the pressure vessel of FIG. 1;

FIG. 6 is a cross-sectional view taken along the line VI—VI of the pressure vessel of FIG. 3;

Figure 2:
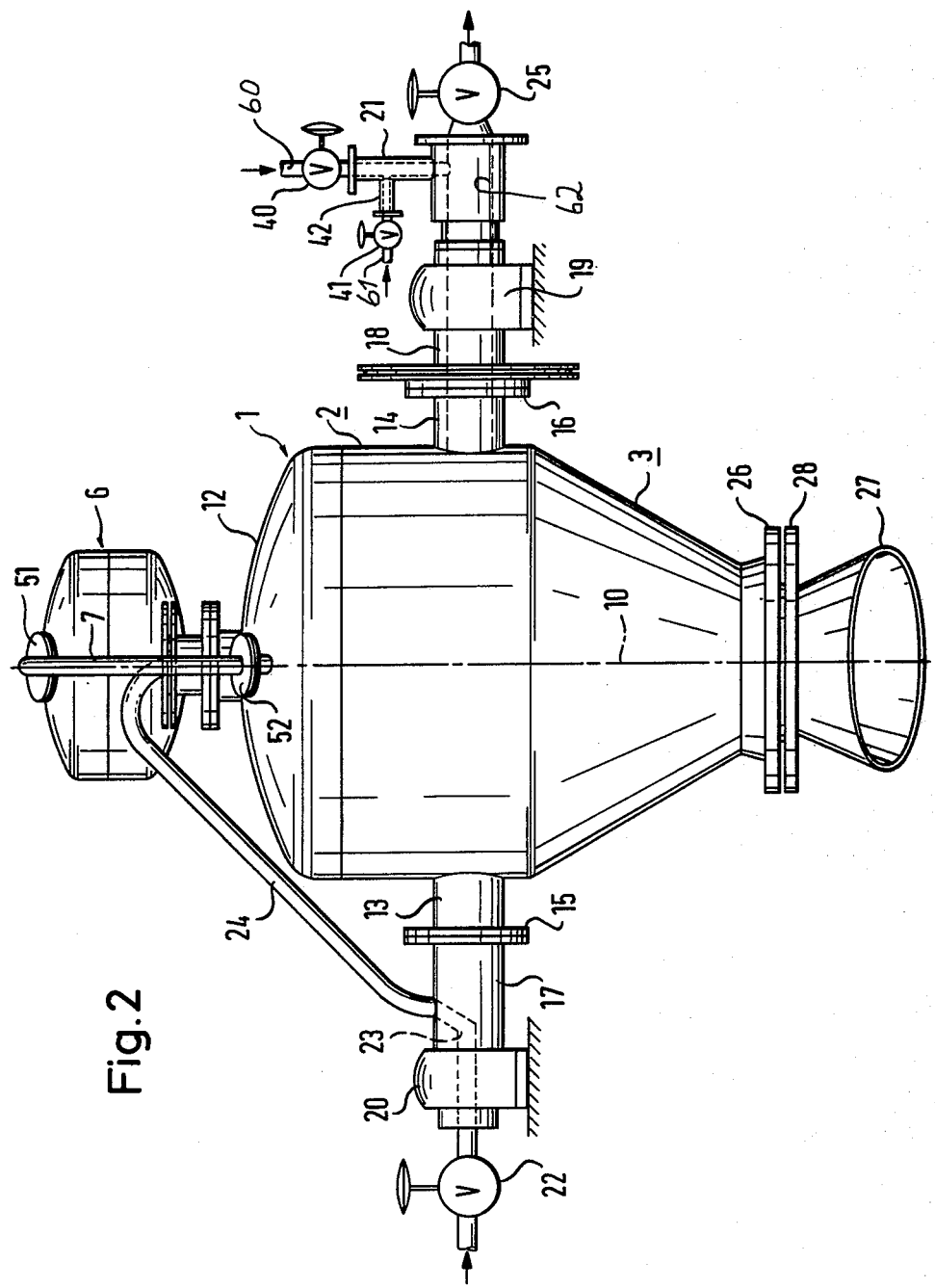
FIG. 2 is a view from the left side of the steam peeler as shown in FIG. 1, but showing the pressure vessel in a discharge position for removal of the processed produce.

Reference will now be made in detail to the preferred embodiments of the invention, examples of which are illustrated in the drawings.

For the purpose of clarity and simplification, only those parts of the various mechanisms that are essential to an understanding of the present method and apparatus have been illustrated in the drawings.

The present invention relates generally to a pressure vessel for a steam peeler or decorticator that receives the produce to be peeled in a generally impact-free manner and that improves the overall steam peeling operation. With reference to FIG. 1 there is shown a pressure vessel generally indicated by 1 having a first bottom portion 2 of cylindrical configuration that is closed at one end by a domed or curved bottom base wall 12 and a top portion 3 connected to bottom portion 2 of oblique frusto-conical configuration that terminates in an opening 4 in the top of the vessel. A flange 26 is provided around opening 4 and a funnel 27 having a mating flange 28 is rigidly secured to flange 26, for example, by means of bolts as shown with the interposing of a gasket 29 or other similar sealing means.

In accordance with the invention, means are provided for opening and closing opening 4 through which the produce is introduced and discharged and to permit the vessel to be pressurized during the steaming operation. As embodied, this means includes an opening 30 in the bottom wall 12 of pressure vessel 1 having a flange 31 and through which a piston-cylinder unit 9 projects into the interior of the vessel. The unit is secured to the vessel by a mating flange 32 and is actuated by introducing an appropriate pressure medium, such as steam, through conduit 24, the supply of which would be controlled by a conventional control means, not shown. A lid 8 to seal off opening 4 is attached to unit 9 and includes a collar 39 and a cooperating pawl 38 that holds the lid 8 in an open position as shown in FIG. 1 during loading and that automatically releases the lid 8 for closing when the vessel moves to operative position as shown in FIG. 3. The piston-cylinder unit and the lid closing and opening mechanism are generally of the kind described in German Pat. No. 23 25 293. According to the present invention, however, the piston-cylinder unit 9 is mounted in pressure vessel 1 so that its axis 36 is parallel with the axis of symmetry 10 of the bottom portion 2 of vessel 1 (see FIG. 2) and offset relative thereto so that axis 36 of the unit extends through the center 35 of the opening 4 (see FIG. 6) in the frusto-conical portion 3 of the vessel.

As best shown in FIGS. 2 and 6, pressure vessel 1 is supported for pivotal movement about a horizontal axis 34 by two pivot shafts 13 and 14 which are connected via flanges 15 and 16, with shafts 17 and 18, respectively, which in turn are rotatably mounted in stationary bearings 19 and 20. The vessel is mounted so that axis 34 passes through the center of gravity of the vessel. This arrangement, however, is conventional and additional details of the connection between pivots 13 and 14 and shafts 17 and 18 are more fully described in the earlier mentioned German Pat. No. P 12 34 690.

According to the present invention, however, and as shown in FIG. 6, the center of gravity and the pivot axis 34 of pressure vessel 1 are located between the axis of symmetry 10 of the cylindrical portion 2 of vessel and the axis 36 of piston-cylinder unit 9.

With reference to FIG. 2, steam is supplied to the interior of pressure vessel 1 to peel the produce through a feed pipe 60 controlled by a valve 40 that connects through a pipe 21 to an internal bore 62 in shaft 18 that extends through pivot shaft 14 and into the interior of vessel 1. Conduit 24 through which pressure medium is admitted to piston-cylinder unit 9 is connected to a bore 23 in shaft 17, the flow of which is controlled by a valve 22.

In accordance with an object of this invention, and with reference to FIG. 1, means are provided for introducing water into pressure vessel 1 to provide a water bath 43 in a bottom portion of the vessel for receiving the produce introduced into the vessel in a gentle and careful manner. As embodied and as shown in FIG. 2, this means comprises a water feed pipe 61 connected to a suitable source of water, the flow of which is controlled by a valve 41, that is connected to pipe 21 through a connecting pipe 42 for admitting water through bore 62 into the interior of the vessel.

The funnel 27 is of such a shape that its opening will point in the upward direction when the pressure vessel 1 occupies the loading postion inclined to the vertical as shown in FIG. 1 for receiving fruit or like produce. Thus it can be seen that as the produce is fed in through funnel 27, it will slide down wall 37 of frusto-conical section 3 into the interior of vessel 1, with wall 37 acting as a guiding chute or slide and into the bath of water 43 located in the bottom corner of the vessel.

In accordance with a preferred embodiment of this invention, means are provided permitting withdrawal of at least a portion of bath 43 prior to steam peeling of the produce in the vessel. As embodied and as shown, for example in FIG. 1, this means comprises a water outlet opening 5 connected to a reservoir 6 attached to the bottom 12 of vessel 1 through a connection consisting of a pipe 44, mating flanges 45 and 47 and a pipe 46. Opening 5 is spaced away a preselected distance from the edge of the vessel 1. The distance is set so that when water is introduced into the vessel through bore 62, while the vessel occupies a loading position as shown in FIG. 1, a water bath 43 of suitable depth is obtained in the bottom corner of the vessel without, however, the water running out through water outlet opening 5. The reservoir 6 typically consists of two domed halves 48, 48a which are secured together by welding and adapted to withstand the same pressure as vessel 1.

For venting or pressure relief purposes, reservoir 6 communicates with the interior of the pressure vessel at a second point through a series of connected pipes 49, 7 and 53, pipes 49 and 7 being connected via mating flanges 50, 51 and pipes 7 and 53 through mating flanges 52, 54. Sieves or strainers 55, 56 are fitted over water outlet opening 5 and connector pipe 53, respectively, to prevent processed fruit or residual peelings from passing through these openings. The size of reservoir 6 must be at least large enough to receive the volume of water bath 43 so that all the water can be drained from the vessel, if desired.

In operation and with reference to FIGS. 1–4, water bath 43 is obtained by first admitting water through the valve 41 prior to loading the produce to be processed in the pressure vessel. Thus, when the produce or fruit slides down wall 37 when the vessel is in feeding position as shown in FIG. 1, the produce will fall into the water bath which breaks or softens the fall, thus permitting the fruit to be received by the vessel in a relatively impact-free manner. Since the fruit no longer impinges against the hard walls of the vessel, the risk of bruising or crushing is greatly reduced. It can also be seen that the offset location of filler opening 4 and the opening and closing mechanism, including lid 8 and piston-cylinder unit 9, prevents these mechanisms from interfering with the loading operation.

As the fruit drops into the water bath, some of the water will run out through overflow pipe 5 into reservoir 6. After loading, the pressure vessel is preferably pivoted to the upright or operative position as shown in FIG. 3 in the direction of the arrow as shown in FIG. 1 during which all the residual water which may have remained in the vessel will run down the curved bottom wall 12 and into reservoir 6. Such movement of the vessel will also cause pawl 38 to gravitationally drop out of engagement with collar 39, thereby unlocking lid 8 and permitting cylinder-piston unit 9 to move the lid into the sealed position as shown in FIG. 3 so that the vessel can be pressurized.

Steam is thereafter admitted through valve 22 and bore 23 and pipe 24 moving the piston and the lid into the position shown in FIG. 3, thus closing the pressure vessel 1. As soon as lid 8 contacts gasket 29 the steam is admitted into the pressure vessel through openings not shown provided in the cylinder.

At the end of the steam peeling process and with the vessel in the position shown in FIG. 3, the lid 8 is returned to the open position by deactivation of piston-cylinder unit 9 and then the vessel is swung opposite to the direction of the arrow in FIG. 1 which again brings pawl 38 into engagement with collar 39 to keep lid 8 in an open position. The vessel 1 is pivoted all the way around to its discharge position as illustrated in FIG. 4 where the opening 4 points downward. The peeled or processed fruit will then slide out along wall 37 and through funnel 27 with the result that the peeled fruit is discharged very gently and carefully from the vessel and no bruising or crushing can occur during such emptying of the vessel.

As the pressure vessel is pivoted from its operative or steaming position shown in FIG. 3 to the discharge position in FIG. 4, the water from reservoir 6 will run back into the pressure vessel through connections 44, 46 and be drained therefrom at the same time as and together with the peeled fruit. This assists in the complete removal of the fruit from the vessel and applies particularly well with regard to sticky fruits and vegetables such as bainberry root or scorozo nera which have sticky tendencies after peeling without the addition of water. The emptying process is further facilitated by the configuration of the pressure vessel inasmuch as the fruit does not come into contact with the under part of lid 8 or the retaining mechanism 38, 39. This not only prevents damage to the fruit, but also ensures that the opening and closing mechanism will not become jammed up by fruity juices and particles.

Figure 7:
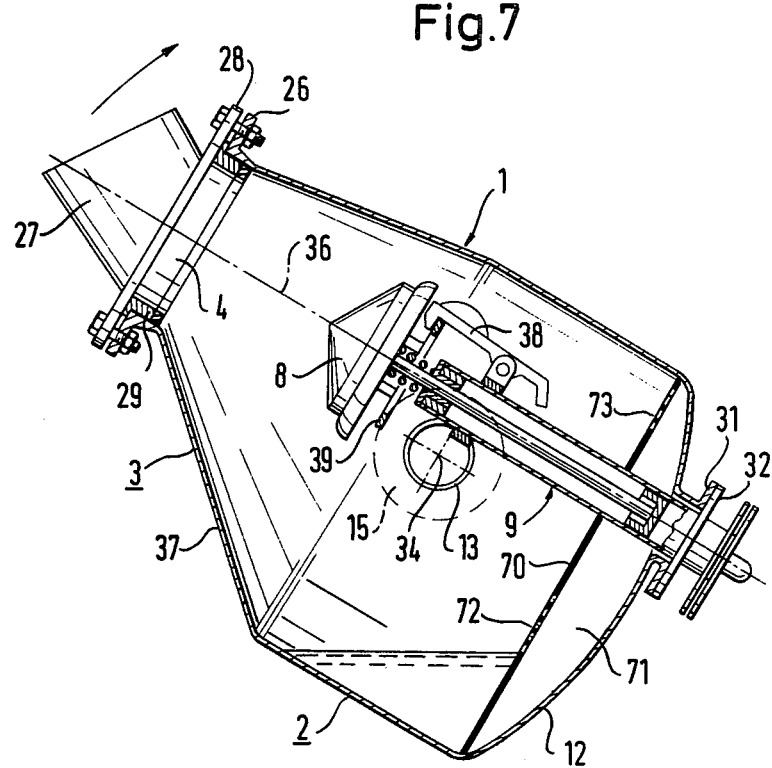
FIG. 7 is an elevational view, partly in section and similar to FIG. 1, illustrating a modified form of the steam peeler of this invention.

In accordance with an alternative embodiment of this invention and as best shown in FIG. 7, a water receiving space or cavity 71 can be formed in the bottom of vessel 2 to receive water bath 43 by an intermediate or double bottom wall 70. Instead of strainers 55 and 56 and connecting pipes 44, 46, small perforations 72 and 73 can be provided in wall 70 to communicate the interior of the vessel with cavity 71. The base wall of the vessel may further comprise a hand hole or trap, not shown, for cleaning space 71. The piston and cylinder unit 9 and lid 8 are the same as shown in FIG. 1.

This arrangement has the advantage of being particularly easy to manufacture but the water will flow more readily from the pressure vessel into reservoir 6 and vice versa than in the construction of this embodiment.

Figure 8:
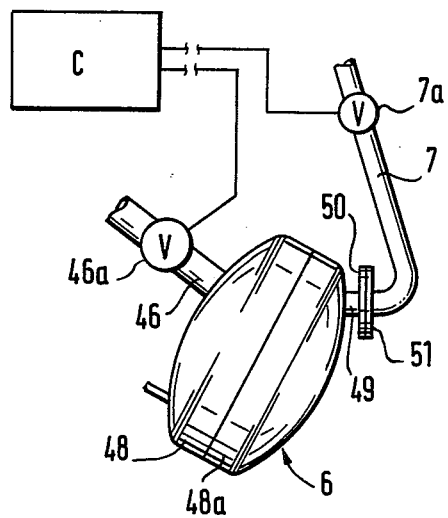
FIG. 8 is a fragmentary view illustrating control means for regulating the withdraw and return of the water bath.

For certain specific applications of the pressure vessel, for example, for peeling certain fruits such as tomatoes or peaches, it may be desirable to leave a certain amount of water in the vessel during the peeling process. For this purpose, a modified form of the invention is shown in FIG. 8, in which a valve 46a is provided which shuts off the communication between pressure vessel 1 and reservoir 6 as well as a valve 7a that shuts off the communication between vent pipe 7 and the pressure vessel when the desired amount of water has been withdrawn. The peeling process can then occur optionally in the presence of water in the pressure vessel. Further, valves 46a and 7a may also be used in the opposite manner to prevent complete or partial draining of water from reservoir 6 when the fruit is tipped out of the pressure vessel. Accordingly, the valves could be opened when the filler opening 4 is closed and be shut when the opening is opened. Control device C is graphically shown for controlling the operations of valves 46a and 7a in the desired manner.

Finally, and in accordance with yet another embodiment of this invention and as best shown in FIG. 3, reservoir 6 may be connected via a valve 58 with a condensate water trap 57 for discharge. This arrangement allows a direct water drainage from reservoir 6 to the exterior. It also allows more water to be drawn from the pressure vessel than might be accommodated by reservoir 6, thereby making it possible to drain off condensation water produced by the wet steam supplied to the pressure vessel.

Additionally to the above described advantages of careful handling of the fruit to be processed, the described special form of the pressure vessel allows the total volume of the pressure vessel relative to the amount of produce to be processed to be substantially smaller than was possible with existing conventional steam peelers. As a result of this, pressure will build up within the pressure vessel 1 in a much shorter time. Such rapid pressure buildup leads to excellent peeling results particularly with soft fruit, such as tomatoes and peaches.

Moreover, in view of the above described asymmetrical design of the pressure vessel, the new steam peeler according to this invention is also extremely well adapted to peel fruit or other produce of awkward and long dimensions such as long cucumbers and manioca because the loading and removal of such fruit is not impeded in any way by virtue of the asymmetrical disposition of the lid and of the piston-cylinder unit.

The invention in its broader aspects is not limited to the specific details shown and described and departures may be made from such details without departing from the invention and without sacrificing its chief advantages.

What is claimed is:

1. An apparatus for steam-peeling produce comprising:
   (a) a pivotally-mounted pressure vessel, said pressure vessel receiving the produce to be steam-peeled by gravity in a generally upright feeding position and discharging the steam-peeled produce after being rotated to a discharge position;
   (b) means for opening said pressure vessel for feeding and discharging the produce and for closing said pressure vessel;
   (c) means for providing a bath of water at the bottom interior of said pressure vessel during said generally upright feeding position for receiving fed produce in a relatively impact-free manner;
   (d) means for withdrawing at least a portion of the water from said pressure vessel including:
      (i) an outlet opening in the region of the water bath; and
      (ii) a reservoir connected to said outlet opening; and,
   (e) selectable means for returning withdrawn water in said reservoir means to said pressure vessel when said pressure vessel is rotated in the direction of its discharge position.

2. An apparatus for steam-peeling produce comprising:
   (a) a pressure vessel pivotally mounted on a generally horizontal axis for receiving the produce to be steam-peeled by gravity in a generally upright feeding position and discharging the steam-peeled produce after being rotated to a discharge position;

(b) means for opening said pressure vessel for feeding and discharging the produce and for closing said pressure vessel for steaming the produce under pressure;

(c) means for providing a bath of water at the bottom interior of said pressure vessel during said generally upright feeding position for receiving fed produce in a relatively impact-free manner;

(d) means for withdrawing at least a portion of the water from said pressure vessel including:

(i) an outlet opening in the bottom interior of said pressure vessel above the initial level of the water bath in said generally upright feeding position and through which water may be withdrawn as produce is fed into said pressure vessel; and (ii) a reservoir is connected to said outlet opening for receiving the withdrawn water and for returning the withdrawn water to said pressure vessel when said pressure vessel is rotated to its discharge position for assisting in the discharge of the steam-peeled produce.

3. The apparatus of claim 2, further comprising a conduit and wherein the reservoir is a separate vessel communicating through said conduit with the interior of the vessel.

4. The apparatus of claim 3, including means in the conduit for controlling the amount of water withdrawn and the amount returned.

5. The apparatus of claim 3, including a vent pipe communicating the reservoir with the interior of the pressure vessel.

6. Apparatus of claim 5, including means for selectively closing off the conduit and the vent pipe to the interior of the vessel.

7. The apparatus of claim 6, wherein said selectively closing off means opens said conduit and vent pipe when the pressure vessel is closed and shuts off said conduit and vent pipe when the pressure vessel is opened.

8. The apparatus of claim 2, wherein the reservoir is formed in the bottom of the vessel by a plate that extends across the vessel and is spaced from the bottom thereof, the outlet opening being located in the plate so as to maintain the water bath in the bottom corner of the vessel in the feeding position but permitting the water to run into the reservoir when the produce raises the level of the bath.

9. The apparatus of claim 8, wherein said reservoir formed in the bottom of the vessel is in communication with the interior of said vessel through communication means, said communication means being adapted to be opened when the pressure vessel is closed and to be shut off when the pressure vessel is opened, and further comprising means for opening and closing said communication means.

10. The apparatus of claim 2, wherein the pressure vessel comprises a first cylindrical section forming the bottom portion of the vessel, a second frusto-conical section forming the top portion of the vessel and an opening in the top portion offset with respect to and above the symmetrical axis of the bottom portion with the vessel in the feeding position, so that the produce fed to the vessel in the inclined feeding position will slide down the interior side walls of the top portion and into the water bath located in the bottom corner on the opposite side of the symmetricl axis of the bottom portion.

11. The apparatus of claim 10, wherein the opening and closing means comprises a lid located inside the vessel and means for moving the lid between a closing position where it seals off the opening and an open position permitting produce to be fed to the vessel.

12. The apparatus of claim 11, wherein the means for moving the lid is a piston and cylinder unit having an axis coincidental with the center of the vessel opening.

13. The apparatus of claim 11, wherein the horizontal axis of the vessel passes through the center of gravity of the vessel and is located between said symmetrical axis and the axis of the piston and cylinder unit.

* * * * *